June 10, 1969  T. J. DYKZEUL ET AL  3,448,764
DUAL STAGE CONTROL DEVICE
Original Filed Jan. 27, 1961

United States Patent Office 3,448,764
Patented June 10, 1969

3,448,764
DUAL STAGE CONTROL DEVICE
Theodore J. Dykzeul, Rolling Hills, and Edward B. Scharer, Lynwood, Calif., assignors to Robertshaw Controls Company, a corporation of Delaware
Application Jan. 21, 1965, Ser. No. 429,203, now Patent No. 3,338,264, dated Aug. 27, 1967, which is a continuation of application Ser. No. 85,276, Jan. 27, 1961. Divided and this application July 31, 1967, Ser. No. 657,153
Int. Cl. F16k 31/12, 31/36; F16f
U.S. Cl. 137—505.41                7 Claims

ABSTRACT OF THE DISCLOSURE

This disclosure relates to pressure regulator means wherein the valve member is carried by a flexible diaphragm and is urged away from its valve seat in opposition to the pressure fluid passing through the valve seat and acting on the diaphragm by spring means acting against one end of a lever to fulcrum the lever and have the other end of the lever operatively engage the valve member, the force of the spring means being selectively increased to increase the rating of the regulator by either changing the fulcrum point of the lever and/or adding additional spring force thereto.

---

This application is a division of its copending patent application, Ser. No. 429,203, filed Jan. 21, 1965, now Patent No. 3,338,264, which, in turn, is a continuation of its copending patent application, Ser. No. 85,276, filed Jan. 27, 1961, now abandoned.

This invention relates to control devices for regulating the flow of gaseous fuel to the burners of appliances, such as water heaters or space heaters, and is an improvement of the device disclosed in copending application Ser. No. 804,748 filed Apr. 7, 1959, now abandoned, and assigned to the assignee of this invention.

Appliances, such as water heaters or the like, are required in some instances to be adaptable to either natural gas, manufactured gas, or liquid petroleum gas. One example of the need for such versatility is in trailer and mobile home installations where a relatively frequent changeover may be required. However, a problem arises due to the different ranges of pressures encountered in changing from natural or manufactured gas to liquid petroleum gas.

It is therefore an object of this invention to adapt the regulator of a fuel control for use with either natural gas, manufactured gas, or liquid petroleum gas installations.

Another object of this invention is to selectively vary the biasing force on a fluid pressure regulator so that it can meet the varying pressure demands of manufactured gas, natural gas, or liquid petroleum gas.

Another object of this invention is to change the biasing force of the regulator to regulate the high pressure range required for liquid petroleum gas from the lower pressure range required by manufactured and natural gas without major disassembly of the control device.

These and other objects and advantages will become apparent from the following detailed description taken in connection with the accompanying drawings wherein.

Figure 1:
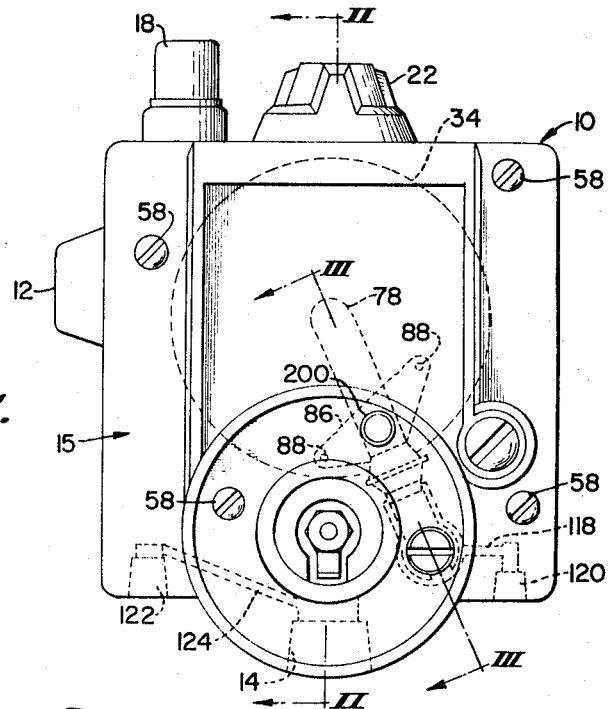
FIG. 1 is a front elevation of a control device embodying this invention with the temperature control knob removed.
Figure 2:
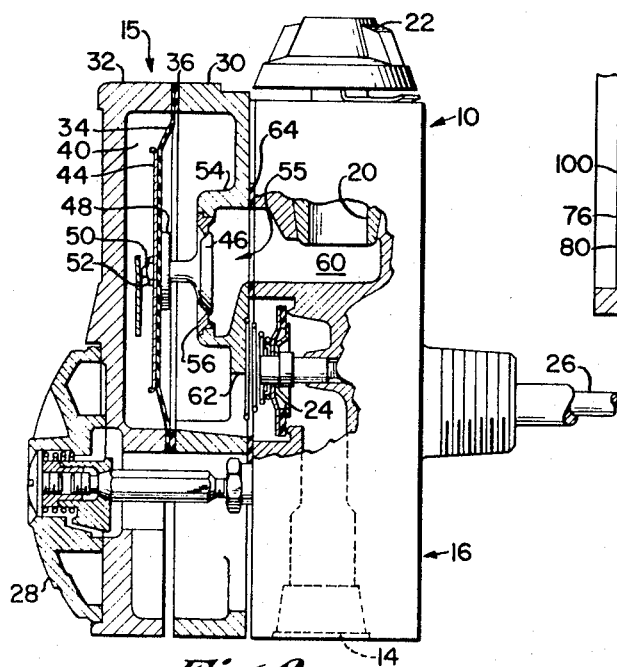
FIG. 2 is a partial sectional view taken along the line II—II of FIG. 1.

Referring now to the drawings and particularly to FIGS. 1 and 2, a control device 10 is illustrated having a regulator casing 15 and a control casing 16. Regulator casing 15 is secured to control casing 16 by screws 58. A suitable gasket 64 is positioned between regulator casing 15 and control casing 16 to prevent leakage therebetween.

As described in the above referred to copending application, control casing 16 is provided with an inlet 12 and an outlet 14 for connection to the fuel supply line of a water heater or the like. Housed within control casing 16 are conventional control elements including a thermoelectrically operated safety valve (not shown) having a manual reset button 18, gas cock 20, and thermostatically operated valve 24. The gas cock 20 is provided with a dial 22 for manual operation thereof and contains appropriate openings for controlling fluid flow to the main burner of the water heater and also for controlling fluid flow to a pilot burner for the main burner. The thermostatically operated valve 24 is operable between open and closed positions in response to a predetermined temperature sensed by a rod and tube assembly 26 of a type well known in the art. A manually operated knob 28 may be provided on the front of regulator casing 15 to select the sensed temperature at which the valve opens.

Regulator casing 15 is formed of casing members 30 and 32 joined together at their peripheries. Disposed between the casing members 30 and 32 is a diaphragm 34 of flexible material nonpermeable to gas. A gasket 36 is provided at the periphery of the diaphragm between the casing members to provide a fluid-tight connection. Diaphragm 34 forms a chamber 40 with casing member 32 and a chamber 42 with casing member 30.

An annular boss 54 is formed in casing member 30 and projects into chamber 42 to define an inlet opening 55 for the passage of fluid into chamber 42. Boss 54 has a flanged inner end accommodating an annular valve seat 56 which, in this case, is press-fitted therein and staked into place. An opening 62 is formed in the wall of casing member 30 adjacent the boss 54 for providing an outlet for the passage of fluid from regulator chamber 42 when demanded in response to the opening of thermostatically operated valve 24.

Carried by diaphragm 34 is a valve member 46 having a circular disc 48 disposed on the stem thereof. A diaphragm pan 44 of a diameter less than the unsupported diameter of diaphragm 34 is provided on the opposite side of diaphragm 34 from valve member 46. A threaded projection 50 extends from disc 48 and is inserted into apertures disposed centrally in the diaphragm 34 and the diaphragm pan 44. A nut 52 cooperates with threaded projection 50 to clamp diaphragm pan 44, diaphragm 34, and valve member 46 together. Valve member 46 cooperates with valve seat 56 to regulate the flow of fluid into chamber 42.

Thus, when gas cock 20 is open, fluid flows into passage 60 in control casing 16 and into regulator chamber 42 through inlet opening 55. When thermostatically controlled valve 24 is open, fluid flows from regulator chamber 42 through opening 62 to outlet 14. The position of valve member 46 is controlled by the fluid pressure in chamber 42. Accordingly, the biasing force on diaphragm 34 tending to move valve 46 away from valve seat 56 determines the range of pressures that can be regulated by valve member 46.

Figure 3:
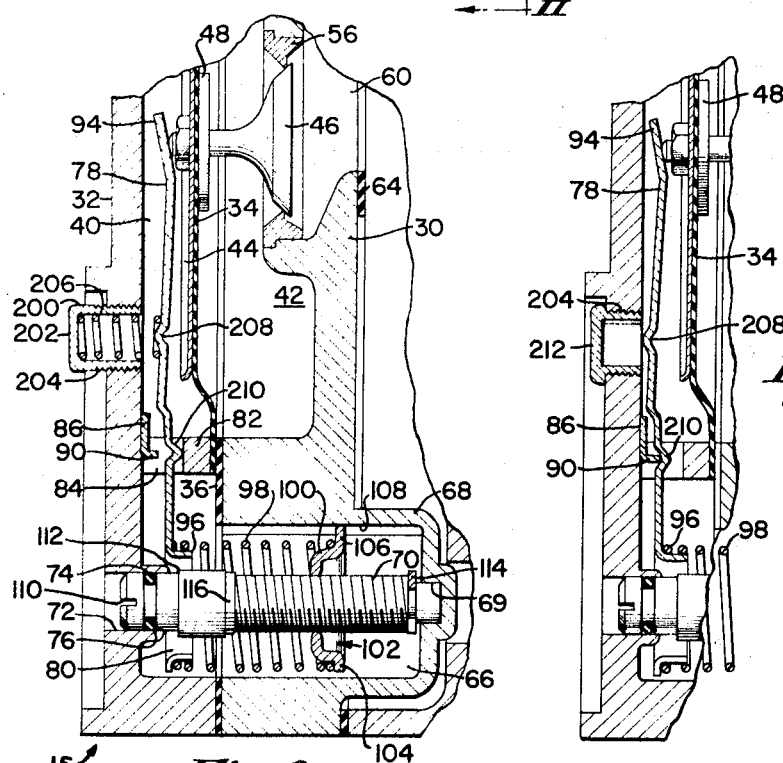
FIG. 3 is an enlarged partial sectional view taken on line III—III of FIG. 1 showing the regulator set for the high pressure range.

Referring now to FIG. 3, a substantially cylindrical smooth-walled adjustment chamber 66 is formed in regulator casing 15 and is disposed in parallel relationship with valve member 46. A projecting portion 68 extends from casing member 30 and provides an end wall for chamber 66. Portion 68 is provided with a centrally disposed recess 69, and an adjustment screw 70 has one end rotatably mounted therein. The outer end of adjustment screw 70 is positioned within a cylindrical aperture 72 formed in casing member 32. A sealing ring 74 is positioned in a groove in adjustment screw 70 for cooperation with the internal wall of an apertured boss 76 which extends inwardly from casing member 32.

A wall 82 separates chamber 40 from adjustment chamber 66 and an opening 84 therein provides communication between adjustment chamber 66 and chamber 40. A lever 78 is provided with a semicircular slotted end 80 which substantially encircles boss 76 and adjustment screw 70. Lever 78 projects through opening 84 in wall 82 and into chamber 40. End portion 94 of lever 78 engages the threaded projection 50 of valve member 46.

The slotted end 80 of lever 78 is provided with an inturned flange 96 around which is mounted one end of a helical coil spring 98. Coil spring 98 surrounds adjustment screw 70 and has its other end mounted around the centrally recessed dome 100 of an annular member 102. Recessed dome 100 is threadedly engaged with adjustment screw 70 which causes annular member 102 to move longitudinally when the adjustment screw 70 is rotated by insertion of the appropriate tool in slot 110 provided in the end of the screw. An annular shoulder 112 is provided on the adjustment screw 70 and is adapted to engage boss 76 to maintain adjustment screw 70 in position in recess 69.

A keyway 108 is formed in the wall of adjustment chamber 66 and extends parallel to the longitudinal axis thereof. The peripheral edge portion 104 of annular member 102 is provided with a projection forming a key 106 which extends into keyway 108 to prevent annular member 102 from rotating within chamber 66. An imperfect thread 116 is provided at the upper end of the threaded portion of adjustment screw 70 and is adapted to limit movement of annular member 102 and compression of coil spring 98. A C-shaped washer 114 is crimped into an annular groove formed adjacent the end of adjustment screw 70 and is adapted to engage annular member 102 to limit the extension of coil spring 98.

A substantially triangular-shaped member 86 is fastened to casing member 32 by suitable means 88 and is provided with an inwardly extending lip 90 which projects into opening 84. During low pressure regulation of natural or manufactured gas, lip 90 cooperates with the inner recess of a rib 210 formed in lever member 78 to provide a pivot point for lever 78. For high pressure regulation of liquid petroleum gas, rib 210 cooperates with wall 82 to provide a fulcrum for lever 78 for reasons to be described presently.

As shown in FIG. 1, a passage 118 is provided in casing member 30 which provides communication between adjustment chamber 66 and a bleed connection 120. Air is thus bled from chamber 40 through adjustment chamber 66 to passage 118 and subsequently out of bleed connection 120. A pressure tap 122 may be provided in casing member 30 having a passage 124 communicating with the outlet to directly sense the outlet pressure of the device.

In operation, the gas cock 20 is manually operated by dial 22 to control gas flow through the end of gas cock 20 into passage 60. The flow of gas from passage 60 into chamber 42 is regulated by valve member 46. The gas flows from chamber 42 through opening 62 to thermostatically operated valve 24. The thermostatically operated valve 24 is operable between open and closed positions by the rod and tube asembly 26 which is responsive to an external condition, such as the temperature of water in a tank, to control fluid flow through outlet 14 to a main burner (not shown) situated in heating relationship to the water tank. The diaphragm mounted valve 46 is responsive to inlet pressure from passage 60 and outlet pressure in the lower diaphragm chamber 42 to regulate the pressure and the control device 10 in the conventional manner.

During operation, air is bled from chamber 40 through adjustment chamber 66, passage 118, and bleed connection 120. An orifice plug may be disposed in bleed connection 120 to retard the regulator response upon opening of the thermostatic valve 24 to prevent initial overgassing of the main burner. This orifice also provides a damping effect to prevent regulator vibration at low flows on low capacity burner applications.

The biasing force on diaphragm 34 tending to move valve member 46 away from valve seat 56 may be adjusted by inserting a screw driver blade into slot 110 and rotating adjustment screw 70. The rotation of adjustment screw 70 will move annular member 102 longitudinally, thereby varying the compression of the adjustment spring 98. The force exerted by the compression of spring 98 is transmitted by lever 78 to diaphragm 34. An increase in the compression of spring 98 increases the biasing force on diaphragm 34, thereby increasing the gas pressure in chamber 42.

The construction described above is designed for use with natural and manufactured gases having normal inlet pressures ranging from 6 inches of water column to 13 inches of water column and an adjustable outlet range varying between 2 inches of water column and 6 inches of water column. The regulator spring 98 is designed to provide this range of adjustment.

By using a higher force regulating spring, the regulators can be adapted for use in the liquid petroleum range with outlet pressures of from 4 inches of water column to 13 inches of water column and with inlet pressures from 8 inches of water column to 25 inches of water column. However, such change of the regulator spring would have to be made in the factory for liquid petroleum use, since to change the spring would require disassembly of the regulator assembly which would be undesirable in the field.

Means will now be described by which the biasing force on diaphragm 34 can be increased beyond the capacity of adjusting spring 98 whereby the capacity of the regulator can be changed from the natural and manufactured gas outlet pressure range to the liquid petroleum pressure range and back again without removal of the basic natural or manufactured gas regulator spring or any major disassembly of the control.

Referring now to FIG. 3, auxiliary means are provided for increasing the biasing force on diaphragm 34 beyond the capacity of the force that can be exerted by spring 98 so as to provide a total force on diaphragm 34 sufficient to regulate the higher pressures encountered by liquid petroleum gas.

The auxiliary biasing means includes an externally threaded hollow cylindrical cap 200 having a closed end 202. A threaded aperture 204 is provided in the wall of casing member 32 and cylindrical cap 200 is threadedly engaged with aperture 204. Inserted into cap 200 is an auxiliary spring 206. Auxiliary spring 206 is snapped into place in an internal annular groove at the base of cap 200 so as to retain it in place. The outer end of auxiliary spring 206 engages lever 78 and surrounds a raised rib 208 on lever 78 which prevents slippage. Rib 210 of lever 78 is biased away from lip 90 and into engagement with wall 82 by auxiliary spring 206. Thus, the fulcrum for lever 78 is shifted from lip 90 to wall 82. As the direction of force exerted by auxiliary spring 206 is opposite to that exerted by spring 98, the moments exerted by these forces are added, since the forces are on opposite sides of the fulcrum.

The combined moment provided by auxiliary spring 206 and spring 98 provides a biasing force sufficient to adapt the regulator to the liquid petroleum pressure range. If it is desired to obtain maximum flow through the regulator without regulation, auxiliary spring 206 can be provided with sufficient force to effectively block open regulator valve 46 for all normal liquid petroleum inlet pressures.

Figure 4:
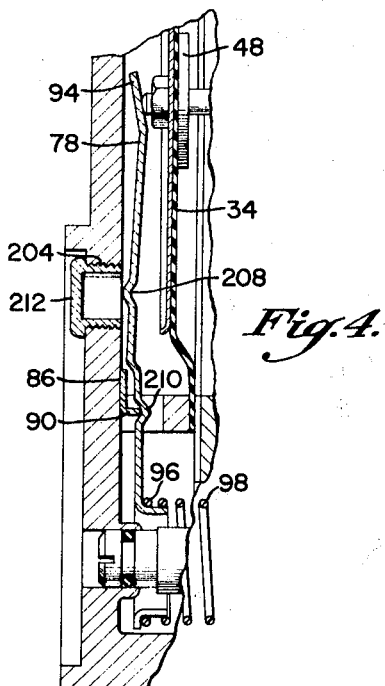
FIG. 4 is a view similar to FIG. 3 showing the regulator set for the low pressure range.

To convert the regulator back to the natural and manufactured gas pressure range, it is only necessary to remove cap 200 and auxiliary spring 206 from aperture 204. However, in order to maintain the damping effect of the bleed orifice and passage 118, aperture 204 must be covered. To this end, a plain cap 212, that is, without an auxiliary regulating spring, is provided to replace cap 200 in aperture 204, as shown in FIG. 4. Removal of auxiliary spring 206 causes lever 78 to shift, due to the bias of spring 98, to a position where the groove formed by the rib 210 engages lip 90; thus, the fulcrum of lever 78 is shifted back to lip 90 and the biasing force is decreased to the natural and manufactured gas pressure regulating range.

A blank threaded mounting hole for the liquid petroleum regulator cap 200 containing the auxiliary regulator spring 206 or the plain cover cap 212, whichever is not in use in a particular application, may be provided on the bottom of the regulator casing. This will provide a means for keeping both caps with the control and will prevent loss or misplacement.

Figure 5:
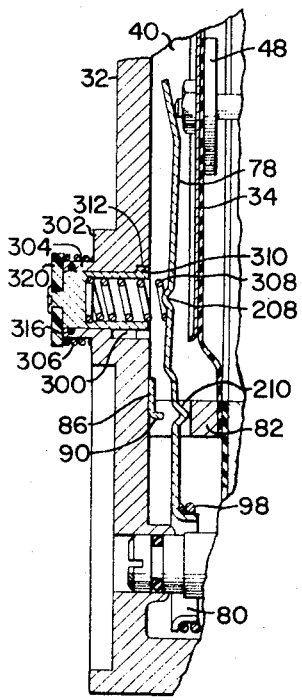
FIG. 5 is a view similar to FIG. 3 showing another embodiment of the invention with the regulator set for the high pressure range.
Figure 6:
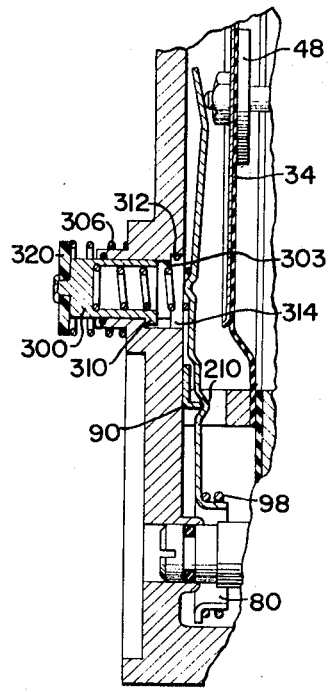
FIG. 6 is another view of the embodiment shown in FIG. 5 wherein the regulator is set for the low pressure range.

A second means of providing additional biasing means for converting to liquid petroleum gas regulation is shown in the embodiment illustrated in FIGS. 5 and 6 wherein corresponding structural members previously described are given like reference numerals.

Referring to FIGS. 5 and 6, the wall of casing member 32 is provided with a boss 302 having a cylindrical projection 304 projecting therefrom. Boss 302 and cylindrical projection 304 form a smooth-walled aperture 303 in the wall of casing member 32 which communicates with chamber 40. Mounted with a free fit in aperture 303 is a hollow cylindrical plunger 300. A cap 320, which may be of plastic material, is staked to the outer end of plunger 300. A resilient O-ring seal 316 is provided in the inner wall of aperture 303 to provide a gas-tight seal. Plunger 300 is provided with a cylindrical recess 318. An auxiliary spring 308 is snap-fitted at one end into an internal annular groove in the base of cylindrical recess 318. The outer end of auxiliary spring 308 engages lever 78 and surrounds rib 208.

Aperture 303 is provided at its inner end with a circumferential annular groove 312. A longitudinal groove 314 in the wall of aperture 303 intersects groove 312. The inner end of plunger 300 is provided with a projecting key 310 which is selectively engageable with grooves 312 and 314. Cap 320 projects outwardly beyond cylindrical portion 304 to provide a seat for a retracting spring 306. One end of spring 306 engages boss 302 and the other end engages the projecting edge of cap 320. When key 310 is engaged in groove 312, as shown in FIG. 5, retracting spring 306 is compressed between cap 320 and boss 302. In this position, spring 308 exerts a biasing force on lever 78 and shifts the fulcrum of lever 78 from lip 90 to wall 82 where it is engaged by rib 210. This provides an additional biasing force sufficient to regulate pressures encountered with liquid petroleum gas.

When it is desired to shift the regulator to the lower pressure range for regulation of natural and manufactured gases, cap 320 is rotated until key 310 is engaged in longitudinal groove 314. In this position, retracting spring 306 expands, thus urging plunger member 300 outwardly until key 310 abuts the upper wall of longitudinal groove 314, as shown in FIG. 6. In this position, the biasing force of auxiliary spring 308 is removed from lever 78, and the fulcrum is shifted from wall 82 to lip 90. The biasing force on diaphragm 34 is now provided solely by spring 98 and the regulator is adapted to regulate pressure in the natural and manufactured gas range.

The embodiment illustrated in FIGS. 5 and 6 thus provides a self-contained changeover mechanism with no loose parts. The outer face of cap 320 is marked to indicate both the liquid petroleum position and the natural and manufactured gas position.

Figure 7:
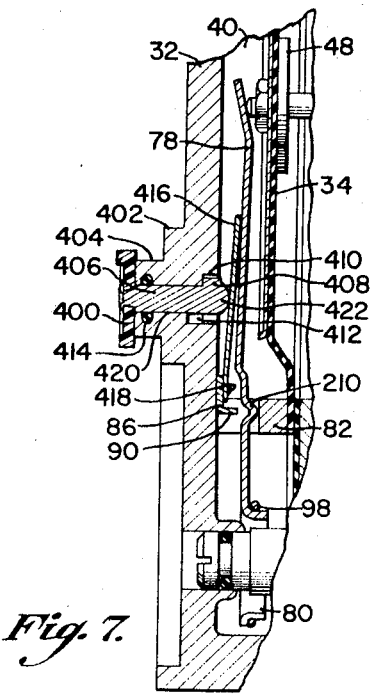
FIG. 7 is a view similar to FIG. 3 showing still another embodiment of this invention with the regulator set for high pressure range.
Figure 8:
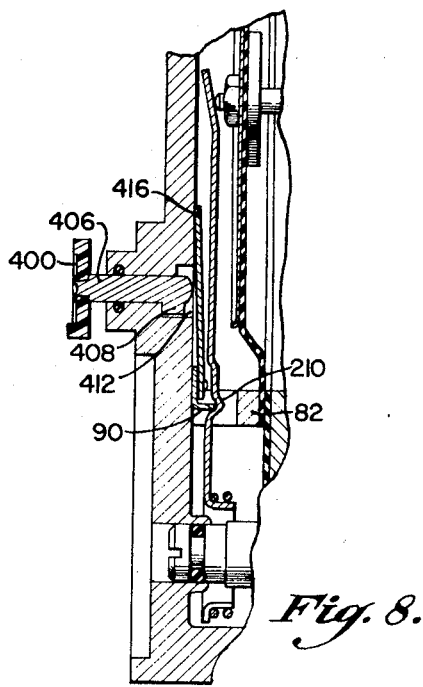
FIG. 8 is a view of the embodiment shown in FIG. 7 showing the regulator set for the low pressure range.

Referring now to the embodiment illustrated in FIGS. 7 and 8, casing member 32 is provided with a boss 402 having a cylindrical projection 404 projecting therefrom. A smooth-walled aperture 420 is provided in the wall of casing member 32 through projection 404 and boss 402. A plunger member 406 freely fits within aperture 420. A cap 400 is staked to the outer end of plunger member 406. Aperture 420 is provided with a resilient O-ring seal 414 to provide a fluid-tight seal between plunger member 406 and aperture 420.

Aperture 420 is provided at its inner end with an annular groove 410 and a longitudinal groove or keyway 412 intersecting the annular groove 410. Plunger member 406 is provided at its inner end with a key 408 which is adapted to be selectively engaged in groove 410 or keyway 412.

Attached at 418 to member 86 is a leaf spring 416. Leaf spring 416 is in axial alignment with lever 78 and has a normal position, as shown in FIG. 8, resting against the wall of casing member 32. When key 408 of plunger member 406 is engaged with groove 410 as shown in FIG. 7, end 422 of plunger member 406 urges leaf spring 416 into a position against lever 78. The fulcrum of lever 78 is thus shifted from lip 90 to wall 82 and an additional biasing force is exerted on lever 78 and diaphragm 34 to provide a regulation capacity within the liquid petroleum gas range.

To change over from the liquid petroleum pressure range to the natural and manufactured pressure range, cap 400 is rotated until key 408 is engaged in keyway 412. Leaf spring 416 then urges plunger member 406 outwardly, as shown in FIG. 8, thus removing the biasing force from lever 78. Adjusting spring 98 then urges lever 78 back into a position where the groove of rib 210 engages lip 90, thus shifting the fulcrum point from wall 82. The regulator is now set for regulation in the lower pressure range of natural and manufactured gases.

Figure 9:
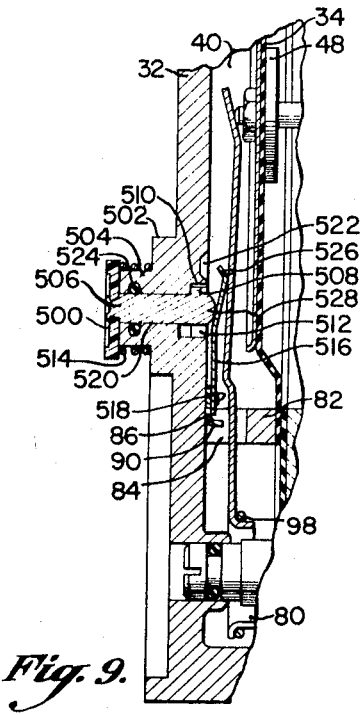
FIG. 9 is a view similar to FIG. 3 showing still another embodiment of this invention with the regulator set for the high pressure range.
Figure 10:
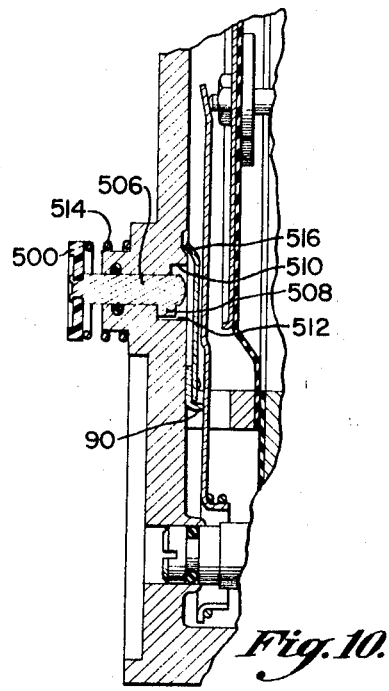
FIG. 10 is a view of the embodiment shown in FIG. 9 illustrating the regulator set for the low pressure range.

Another embodiment of the invention is illustrated in FIGS. 9 and 10. Casing member 32 is provided with a boss 502 having a cylindrical projection 504 projecting therefrom and having an opening 520 therein. A plunger member 506 freely fits within opening 520. A cap 500 is staked to the outer end of plunger member 506. An O-ring seal 524 is provided in the wall of aperture 520 to provide a fluid-tight seal between plunger member 506 and the walls of aperture 520.

Aperture 520 is provided at its inner end with an annular groove 510 and a longitudinal groove or keyway 512 which intersects annular groove 510. A key 508 projects from the inner end of plunger member 506 and is selectively engageable with groove 510 and groove 512. Cap 500 projects outwardly beyond cylindrical projection 504 and a retracting spring 514 has one end engaged with the outer projecting edge of cap 500 and the other end engaged with boss 502.

Mounted on member 86 at 518 is a leaf spring 516 having a curved portion 526 at its free end. A recess 522 is provided in the inner wall of casing member 32 for receiving curved portion 526 of leaf spring 516. Leaf spring 516 has a normal position in which curved portion 526 is received in recess 522, as shown in FIG. 10. When key 508 is engaged in groove 510, as illustrated in FIG. 9, end 528 of stem 506 causes leaf spring 516 to be flexed to a position where curved portion 526 engages lever 78 and urges lever 78 out of engagement with lip 90. It should be noted that in this embodiment of the invention, rib 210 of lever 78 has been eliminated and that, in the position shown in FIG. 9, lever 78 is not engaged with wall 82, but is free to move within opening 84 without interference within the limits required to operate the lever in the liquid petroleum gas range. Thus, it is seen that the fulcrum point of lever 78 is shifted from lip 90 to the point where curved portion 526 engages lever 78. This results in a considerable increase in the length of the moment arm between adjusting spring 98 and the fulcrum point, thereby increasing the biasing force on diaphragm 34. This increase in biasing force is, of course, sufficient to provide for regulation of liquid petroleum gas. Leaf spring 516 is of sufficient strength and thickness that no significant amount of flexing will occur within the range of operating pressures.

When it is desired to shift back to the lower pressure ranges for natural and manufactured gas, cap 500 is rotated until key 508 is engaged in keyway 512. Retracting spring 514 then urges plunger member 506 to the left, as shown in FIG. 10, to a position where key 508 abuts the upper end of keyway 512. End 528 of plunger member 506 is thus brought out of engagement with leaf spring 516. Leaf spring 516 then returns to its normal position with end portion 526 received in groove 522. The fulcrum point of lever 78 is thus shifted back to lip 90 of member 86 and the biasing force on diaphragm 34 is thus reduced to provide regulation of natural and manufactured gases.

Figure 11:
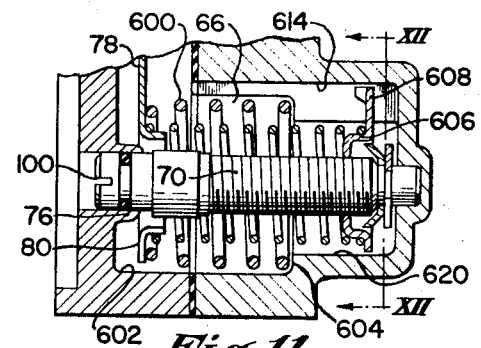
FIG. 11 is a view similar to FIG. 3 showing still another embodiment of the invention.
Figure 12:
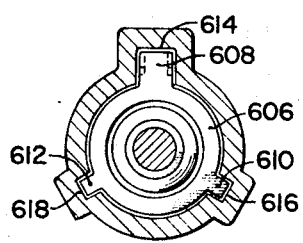
FIG. 12 is a view taken on line XII—XII of FIG. 11.

Referring now to FIGS. 11 and 12 where still another embodiment of the invention is illustrated, an auxiliary biasing spring 600 is concentrically mounted with respect to spring 98 in adjustment chamber 66. Adjustment chamber 66 is provided with an upper enlarged portion 602 and a lower portion 620. Upper portion 602 is of greater diameter than lower portion 620 and is separated from lower portion 620 by a circular shoulder 604. The flange of slotted end 80 of lever 78 is enlarged so that it can receive both spring 98 and auxiliary adjustment spring 600. The other end of auxiliary spring 600 rests on shoulder 604. The free length of auxiliary spring 600 is such that when its lower end rests on shoulder 604 it exerts no biasing force on lever 78.

A plurality of longitudinal keyways 614, 616, and 618 are provided in the walls of lower portion 620 and are disposed radially from the center thereof. An annular member 606 is threadedly engaged with screw 70 and is adapted to travel longitudinally in chamber 66 as screw 70 is rotated. Annular member 606 has projecting therefrom key members 608, 610, and 612, which are received respectively in keyways 614, 616, and 618. It should be noted that keyways 616 and 618 extend only the length of lower portion 620 while keyway 614 extends the full length of chamber 66. Accordingly, key 608 and keyway 614 are larger than keys 610 and 612, and keyways 616 and 618, respectively. Key 608 is always received in keyway 614 regardless of the position of annular member 606 in chamber 66 while key 610 and key 612 are in their respective keyways only when annular member 606 is in lower portion 620 of chamber 66.

When it is desired to regulate the higher pressure encountered by liquid petroleum gas, screw 70 is rotated until member 606 is moved into the upper portion 602 of chamber 66. As annular member 606 is moved into upper portion 602 past shoulder 604, keys 608, 610, and 612 pick up auxiliary spring 600. Further movement of annular member 606 upwardly in upper portion 602 compresses spring 600 and provides an additional biasing force to that of spring 98 for lever member 78. This additional biasing force is likewise transmitted through lever 78 to diaphragm 34 to thereby adapt the regulator for liquid petroleum gas regulation.

When it is desired to regulate the pressures in the lower pressure range of natural and manufactured gases, screws 70 is rotated until annular member 606 returns to lower portion 620 of chamber 66. This removes the biasing force exerted by auxiliary spring 600 which is no longer under compression when it comes to rest on shoulder 604. Accordingly, the only biasing force on diaphragm 34 is that which is exerted by compression of spring 98. The travel of member 606 within lower portion 620 provides sufficient adjustment range for the lower pressure range of natural and manufactured gases.

What is claimed is:

1. In a fluid pressure regulator, a casing having an inlet and an outlet providing a fluid passage therebetween, valve means for controlling flow through said inlet, a flexible diaphragm in said casing connected to said valve means for opening and closing said valve means in response to pressure changes in said passage, means engageable with said diaphragm for biasing said valve means toward an open position, and means accessible from the exterior of said casing for augmenting the force of said biasing means to thereby increase the regulating capacity, said biasing means comprising a lever, an adjustment chamber in said casing having an upper enlarged portion and a lower portion, a circular shoulder defined by the junction of said upper portion with said lower portion, an adjusting screw axially disposed in said adjustment chamber and being rotatable therein and having one end thereof accessible from the exterior of said casing, a plurality of longitudinal keyways in the wall of said lower portion, one of said keyways extending into said upper portion, an annular member threadedly engaged with said adjusting screw and having a plurality of keys engaged in said plurality of keyways, said lever having a slotted end portion encircling said adjusting screw, an adjusting spring encircling said adjusting screw having one end engaged with said slotted end portion and the other end engaged with said annular member whereby rotation of said adjusting screw causes said annular member to move axially in said adjustment chamber to vary the compression on said adjusting spring, said augmenting means comprising an auxiliary adjusting spring encircling said adjusting spring and having one end engaged with said slotted end portion and the other end engaged with said shoulder when said annular member is positioned by adjusting screw in said lower portion of said adjustment chamber, said other end of said auxiliary adjusting spring being engageable with said keys as said annular member moves into said upper portion upon rotation of said screw whereby said auxiliary adjusting spring exerts an additional biasing force on said lever and said diaphragm.

2. In a fluid pressure regulator as set forth in claim 1, said one keyway being the only keyway that extends into said upper portion.

3. In a fluid pressure regulator as set forth in claim 1, said one keyway always receiving its respective key of said annular member whether said annular member is in said lower portion or is in said upper portion.

4. In a fluid pressure regulator as set forth in claim 1, said one keyway and its received key of said annular member being larger than the other keyways and their respective keys.

5. In a fluid pressure regulator as set forth in claim 1, said adjustment chamber in said casing being defined by a stepped bore means therein that defines said upper and lower portions.

6. In a fluid pressure regulator as set forth in claim 5, said upper and lower portions being substantially circular in cross section and being coaxially aligned.

7. In combination, a casing having a movable control member, said casing having an adjustment chamber provided with an upper enlarged portion and a lower portion, said casing having a shoulder defined by the junction of said upper portion with said lower portion, an adjusting screw axially disposed in said adjustment chamber and being rotatable therein and having one end thereof accessible from the exterior of said casing, said casing having a longitudinal keyway in the wall of said lower portion and extending into said upper portion, an annular member threadedly engaged with said adjusting screw and having a key engaged in said keyway, said control member having a slotted end portion encircling said adjusting screw, an adjusting spring encircling said adjusting screw and having one end engaged with said slotted end portion and the other end engaged with said annular member whereby rotation of said adjusting screw causes said annular member to move axially in said adjustment chamber to vary the compression of said adjusting spring, an auxiliary adjusting spring encircling said adjusting spring and having one end engaged with said slotted end portion and the other end engaged with said shoulder when said annular member is positioned by said adjusting screw in said lower portion of said adjustment chamber, said other end of said auxiliary adjusting spring being engageable with said annular member as said annular member moves into said upper portion upon rotation of said screw whereby said auxiliary adjusting spring exerts an additional biasing force on said control member.

References Cited

UNITED STATES PATENTS

| 2,599,577 | 6/1952 | Norgren | 137—505.18 XR |
| 2,625,954 | 1/1953 | Klein | 137—505.42 XR |
| 2,760,050 | 8/1956 | Miller. | |

FOREIGN PATENTS 1,251,968  12/1960  France.

HAROLD W. WEAKLEY, *Primary Examiner.*

U.S. Cl. X.R.

267—1